Jan. 28, 1969   R. A. ROSENBLUM   3,424,134
INDUSTRIAL SAFETY HARNESS
Filed Dec. 12, 1966   Sheet 1 of 3

INVENTOR
Robert A. Rosenblum.
BY
ATTORNEYS

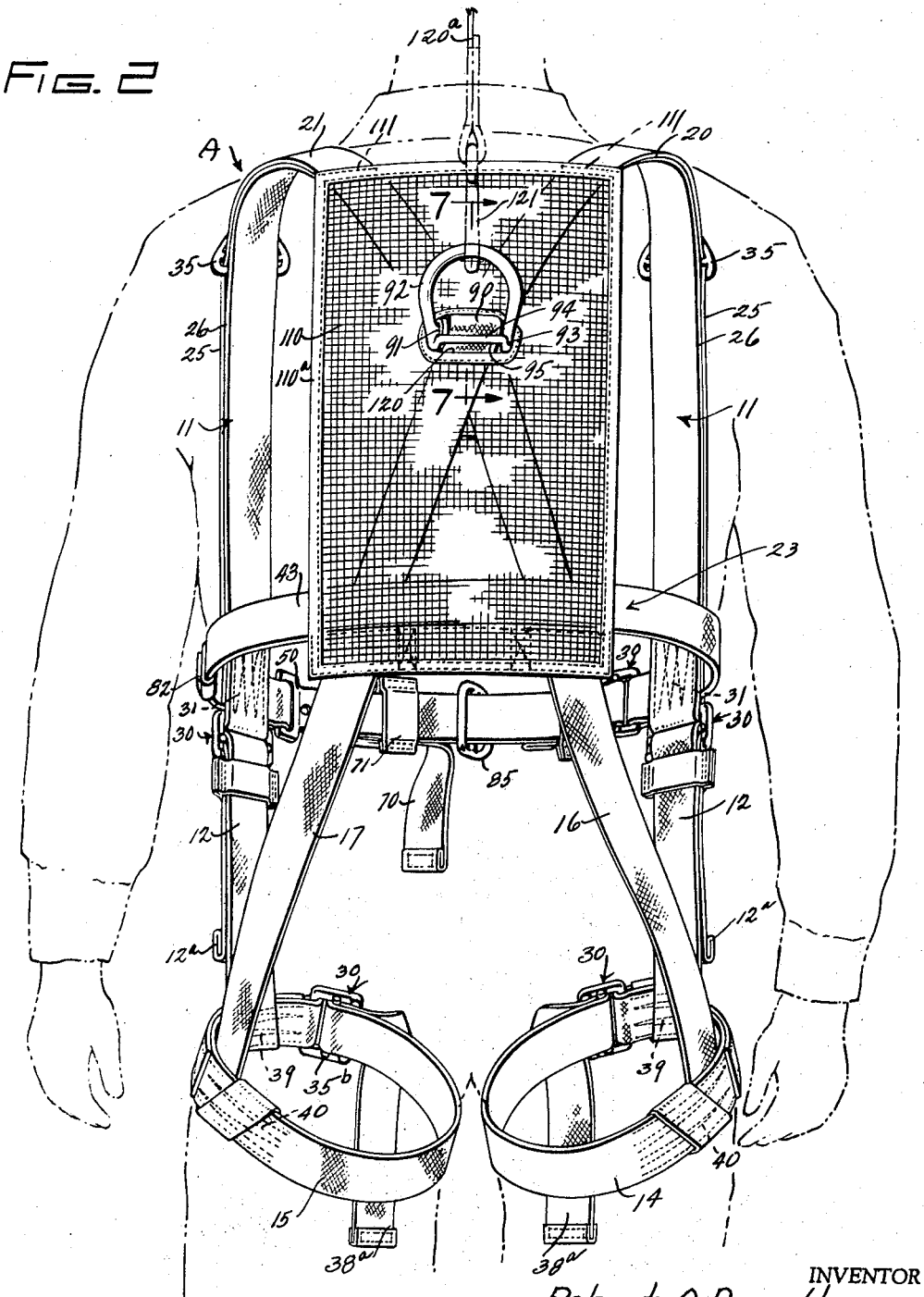

Jan. 28, 1969 R. A. ROSENBLUM 3,424,134
INDUSTRIAL SAFETY HARNESS
Filed Dec. 12, 1966 Sheet 3 of 3
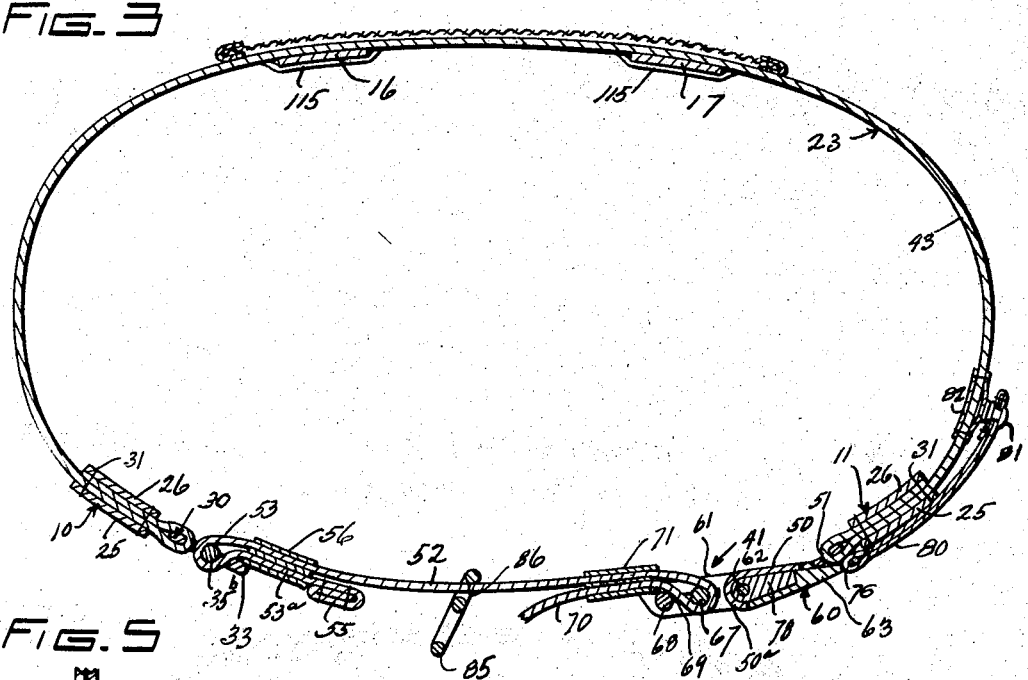
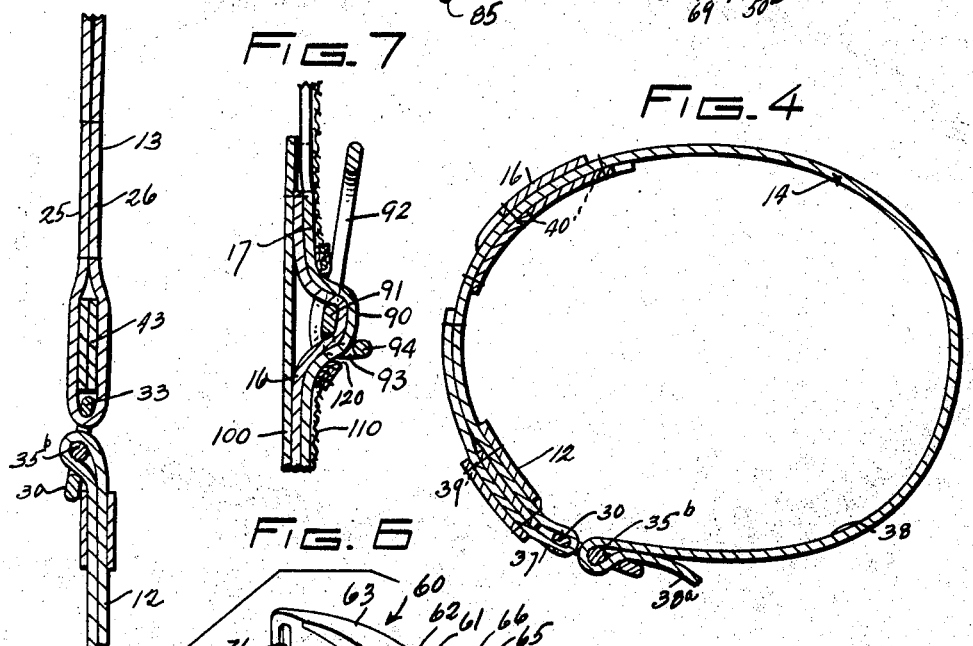
INVENTOR
Robert A. Rosenblum
BY
ATTORNEYS United States Patent Office  3,424,134
Patented Jan. 28, 1969

3,424,134
INDUSTRIAL SAFETY HARNESS
Robert A. Rosenblum, Lexington, Ky., assignor to Irvin Industries Inc., a corporation of New York
Filed Dec. 12, 1966, Ser. No. 600,832
U.S. Cl. 119—96                               13 Claims
Int. Cl. A62b 35/00; B64d 17/30

ABSTRACT OF THE DISCLOSURE

An industrial harness for providing maximum protection and security in any situation requiring an emergency life-line or static support line. The harness is designed for secure attachment of the same upon the body of the wearer in non-interfering relation with the legs and arms of the wearer, with quickly releasable belt means and cross back webs, lanyard attaching means at the shoulders, waist belt, in front of a wearer.

This invention relates to an improved industrial safety harness which will provide a maximum amount of protection and security in every situation which requires an emergency life-line or body support line to be attached thereto. It insures a safe and comfortable suspension of the wearer so that the wearer may have complete freedom of arms and legs.

A further object of this invention is the provision of an improved industrial safety harness which is adjustable to fit the stature of the wearer and to which a static support line may be detachably connected so that in case of a fall the harness will distribute the shock over the strongest parts of the hips and upper chest of the wearer for protection of the wearer's heart and vital organs.

A further object of this invention is the provision of an improved industrial safety harness having an improved front web and back web attachment to a wearer; with improved suspension means so that shock upon the wearer incident to a fall or support of the wearer while performing duties will be taken from the outside of the legs without uncomfortable crotch pressure.

A further object of this invention is the provision of improved means comprising a flexible back member which may be attached to portions of the harness webbing for the purpose of identifying the front of the harness and to prevent entanglement of the harness parts when not in use.

A further object of this invention is the provision of improved belt adjustments and a quick release buckle connection having a multiple safety feature to prevent accidental opening thereof.

A further object of this invention is the provision of an improved industrial safety harness composed of webbing adjustments to fit the stature of the wearer and with which has associated therewith a multiple suspension arrangement both at the front and back portions of the harness.

Other objects and advantages of this invention would be apparent during the course of the following detailed description.

In the accompanying drawings forming a part of this specification, and wherein similar reference characters designate corresponding parts throughout the several views:

FIG. 3 is a cross sectional view taken through the belt structure of the improved harness substantially on the line 3—3 designated in FIG. 1.

FIG. 4 is a cross sectional view taken through the structure of one of the leg loops, substantially on the line 4—4 of FIG. 1.

FIG. 5 is a fragmentary cross sectional view taken substantially on line 5—5 of FIG. 1, showing the upper and lower webbing parts of a front harness web and the association of a belt structure therewith.

FIG. 6 is a perspective view showing the details of a quick release buckle used in a belt structure of the harness.

FIG. 7 is a cross sectional view taken substantially on the line 7—7 of FIG. 2, showing a lanyard connecting ring associated as part of the harness structure.

FIG. 8 is a cross sectional view taken through one of the slidable lock bars on an adjustment connecting member utilized at various places on the harness.

Figures 1, 2:
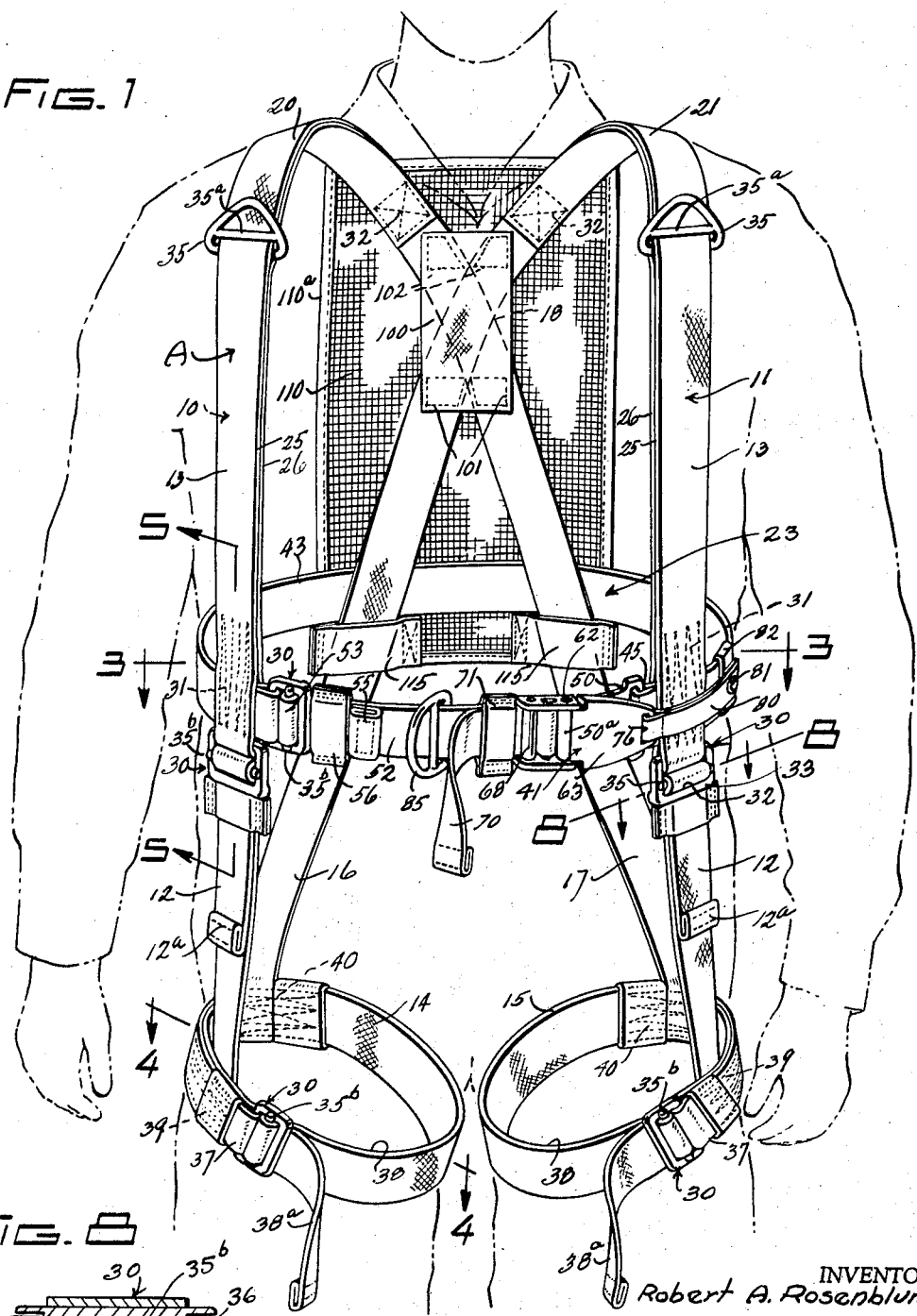
FIG. 1 is a front perspective view of the harness showing the various features thereof in closed relation; a wearer being shown in dot and dash lines.
FIG. 2 is a rear view of the harness as applied to a wearer (shown in dot and dash lines) showing the various features of the harness and a rear lanyard attaching means.

In the drawings wherein for the purpose of illustration is shown only a preferred embodiment of the invention, the letter A may generally designate the harness assembly.

The harness A preferably comprises two webs 10 and 11, each of which is divided into a lower flexible web portion at 12 and an upper web portion 13. Right and left leg loops 14 and 15 are permanently fixed and connected to the lower ends of the lower front web portions 12. Flexible back webs 16 and 17 are fixed to the loops 14 and 15 and extend upwardly at the rear of a wearer and have a crossing point designated at 18 in FIG. 1 of the drawings. The upper ends of the front webs 10 and 11 are connected by shoulder webs 20 and 21 to the upper ends of the back webs 16 and 17 above the point of crossing 18 of the latter. A belt 23 is fixedly connected to the lower ends of the upper web portions 13 of the front webs 10 and 11, the details of which will be hereinafter described.

Referring to the structure of the upper web portions 13 of the front webs 10 and 11, each of the same is composed of an outer flexible web 25 and an inner web portion 26, the lower ends thereof being adjustably looped around an adjustment connector 30 and stitched at 31 to the belt 23 in a manner which will subsequently be described. The web portions 25 and 26 of the upper front webs 13 are loose with respect to each other and at their upper ends the inner portions 26 are stitched at 32 to the shoulder webs 20 and 21 as shown in FIG. 1. The webs 25 and 26 are loose between their stitched connections 31 and 32 for the purpose of slidably receiving a coupling ring 35, a bar of which is located between the web portions 25 and 26 with a cross bar 35ᵃ thereof holding the coupling ring 35 outwardly from the web 25 for receiving snap fasteners of lanyards or other supporting lines or straps.

Referring to the adjustment connectors 30, the same are each of the general nature shown in U.S. Patent 2,130,547 dated Sept. 20, 1938, serving the purpose of adjustably connecting a web to a web so that one web can be moved in one direction only, and which web when moved in the other direction will lock on the connector and prevent relative adjustment of the webs. To that end the connecting member 30 comprises a rectangular shaped ring 33 having an opening 32ª therein. The webs of each of the upper portions 13 of the front webs 10 and 11 are looped around and stitched upon a top bar of the ring 33. In the opening 32 is located a lock bar 35ᵇ which has divided ends providing recesses 36 which slidably receive the side bars of the ring 33 as shown in FIG. 8. In this form of connector for the front webs 10 and 11 the upper ends of the lower strap portions 12 are threaded through the opening 32ª of the ring 33 and looped around bar 35ᵇ, as shown in FIGS. 1 and 8. The loose end 12ª of the web 12 can be pulled to shorten the lengths of the front webs 10 and 11; it being obvious that upward movement of the lock bars 35ᵇ of the connectors 30 will enable the front webs 10 and 11 to be lengthened or shortened.

Referring to the leg loops 14 and 15, each of the same comprises a single length of webbing having one of the connectors 30 associated therewith; one end of the leg loop being fixedly connected as at 37 thereto and the opposite end 38ª being looped around the lock bar 35ᵇ. Thus, the connector 30 for the leg loop serves the same purpose as the connector 30 described above for the front webs 10 and 11, in providing a loop opening 38 which may be adjusted as to size to fit the stature of the wearer.

The bottom ends of the lower web portions 12 are stitched at 39 to the leg loops 14 and 15 adjacent the end 37 of the loop and close thereto the loops 14 and 15 also have the lower ends of the back straps 16 and 17 respectively wound around the leg loop webs and stitched thereto at 40.

Referring to the belt structure 23 the same comprises two lengths of webbing having associated therewith a quick release buckle 41 and a length adjusting connector of the same general type 30 above described. The belt web 23 comprises a back and side portion 43 one end of which is connected by the stitching 31 to the lower end of the right hand web 10 between the portions 25 and 26 of said web; the web portion 43 being doubled upon itself adjacent to the lower end of the right hand web and loop secured to a body bar of a connector 30 in the manner above described. The other end of the web portion 43 is secured by the stitching 31 above described, between the webs 25 and 26 forming the upper web portion 11, providing a loop extension 45 at a side of the lower end of the web portion 13, the purpose of which is to provide securement of a part of the quick release buckle 41 as will subsequently be described.

Referring to FIG. 6 the quick release buckle 41 is shown therein. It includes a hook-shaped section 50 provided with a transverse slotted opening 51 at one end in which the belt loop 45 is connected.

The belt structure 23 furthermore includes a front webbing section 52 the right end 53 of which is looped around the lock bar 35 of a connector 30 above described. The body of this connector 30 is connected to the right end of web 43. The end 53ª is double folded and stitched to provide an obstruction 55 which cannot pass through a retaining sleeve 56 wound about the web section 52 and 53ª as shown in FIG. 3. The purpose of this construction is to provide an adjusting connector for the web section 52 at the right hand front side of the belt. The belt section 52 at its opposite ends has a belt adjusting locking means similar to connector 30, which forms a part of the quick release coupling section 60, shown in perspective in FIG. 6 of the drawing. This section 60 of the buckle includes a connector body portion 61, of rectangular form having a hinge pin 62 as part thereof upon which a buckle part 63 complementary to the buckle part 50 is pivotally connected. The rectangular body portion 61 has side bars 64 and 65 slotted at 66 for receiving a slidable lock bar 67 similar to the lock bar 35 above described. The connector body 61 furthermore includes a bar portion 68 defining an opening 69 adapted to receive therethrough the free double looped end 70 of the web 52, which is looped around the slidable lock bar 67 of the portion 61 of the buckle as shown in FIG. 3. A retaining sleeve 71 is provided through which the free end 70 of the web portion 52 is extended. The manner of belt adjusting and locking is obvious, since pushing or pulling on the free end 70 will enable the web 52 to be shortened or locked.

The quick release buckle 41 includes the elongated part 63 pivoted upon the pin 62 at its barrel portion 75. The end of the belt section 63 has a slot 76 therein, the purpose of which will subsequently be described. Both parts of the buckle 50 and 60 are metal so that they make metal to metal contact. The part 63 in facing relation with the buckle part 50 is provided with a permanent magnet 78. The mode of attachment of the buckle parts 50 and 60 is such that the hook end 50ª engages around the barrel 75 of the buckle section 53, as shown in FIG. 3 and the permanent magnet 78 attracts the body portion of the other buckle part 50 and holds it in position to prevent accidental separation of the buckle parts 50 and 60.

As a safeguard, to prevent accidental opening of the buckle parts 50 and 60, there is provided a flexible tab 80 looped through the opening 76 of the portion 63 of the buckle. This tab 80 extends in direction opposite to the connecting point of buckle parts 50 and 60. At its free end it is provided with a lift-the-dot fastener 81, the male portion of which is connected at 82 on the belt web 43 at the left side of the left web 13.

In order to release the buckle 41 it is only necessary to open the lift-the-dot fastener 81 and swing the buckle part 60 out of engagement with the hook end 50ª of the other buckle section 50.

The belt 23 at the flexible web section at 52 is provided with an outwardly extending lanyard attaching ring 85 threaded through an opening 86 therein. The ring loop extends at the outside of the belt webbing 52 as shown in FIG. 3 and is always in opened position to receive the lanyard snap fastener or other connector.

It should be noted from FIG. 3 that the belt webbing back portion 43 is positioned rearwardly of the cross back webs 16 and 17.

Referring to a lanyard attaching ring which is positioned at the upper back of the wearer on the harness A at the location 18 of crossing of the back straps 16 and 17, the crossed back straps are looped as shown at 90 in FIG. 7 to receive the cross bar 91 of the lanyard attaching ring 92. The lanyard attaching ring 92 is provided with a transverse, preferably right angled extension 93 which includes a cross bar 94 and defines a slot 95 through which the looped portion 90 is threaded; the purpose of the extension 93 being to limit the degree of rotational movement of the lanyard attaching ring 92, so that it almost stands in upward position for attachment of the snap fastener or other connector of a lanyard.

A combination protection pad and loop holding member 100 of webbing material is secured at its lower corners at 101 as shown in FIG. 1, to the straps 16 and 17 below the crossing point 18. The pad or member 100 is of rectangular formation and the upper corners are attached at 102 to the back straps 16 and 17 above the crossing point 18. The webbing member 100 is flexible and of the same material as the other webbing. The points of attachment 101 and 102 are such as to permanently form the loop 90 because the lengths of the back webs between the points of attachment 101 and 102 are greater than the points of pad attaching locations 101 and 102. This pad or member 100 also serves as body protection to the wearer from injury or discomfort incident to the bulging condition of the lanyard attaching ring 92.

There is provided a nylon mesh vest back piece or plate 110, of flexible material, the upper corners of which are stitched at 111 to the web portions 25, as shown in FIG. 2. The member 110 is of such length that it extends downwardly and at the lower corners thereof are provided loops 115, shown in FIGS. 1 and 3 of the drawings, providing pockets through which the back straps 16 and 17 slidably extend. This mesh nylon is marginally bound at 110ª as shown in FIG. 1.

The nylon mesh 110 is located to the rear of the harness, as shown in the drawings and it is provided with a marginally reinforced opening 120 through which the looped portion 90, at the crossing point of the back straps, extends so as to position the lanyard attaching ring 92 at the rear of the mesh member 110. This mesh member 110, formed of nylon prevents harness snarl and maintains the webbing in ready position for donning. It also identifies the front from the back of the harness.

In FIG. 2 is shown a lanyard 120ª in dot and dash lines which may have a snap hook or other attaching member 121 for engagement with the ring 92.

It is understood that the webbing is woven nylon and very strong and durable for the purpose of supporting the wearer under dead weight and under shock in case of emergency. The hardware is strong and durable.

Various changes in the shape, size and arrangement of parts may be made to the form of invention herein shown and described without departing from the scope of the invention as defined.

I claim:

1. In an industrial safety harness the combination of a pair of front flexible upright webs, each having separate upper and lower flexible web portions and means connecting the proximate ends of said web portions to adjust and vary the effective length of each of said front webs, individual leg loops of flexible webbing connected in fixed relation at the extreme bottom ends of each of said lower web portions to the front side portions of said loops, adjusting means to vary the girth of each of said leg loops, rear crossed upright back webs, the crossing location being medially of the harness, the lower ends of said crossed back webs having a fixed connection on the rear of their respective leg loops adjacent to the fixed connection of said front web lower portions, shoulder webs connected to the upper ends of said front web upper portion and the upper ends of said back webs adjacent thereto, and a waist belt having a front quick release buckle connection to open the belt, the belt at each side of the buckle connection having fixed connections with the front flexible upright webs above the leg loops.

2. The harness as described in claim 1 in which the adjustable connections of the upper and lower portions of the front webs and the adjusting means of the leg loops comprises a ring having a slidable lock bar thereon, the lower web portions each having an adjustable end looped around the lock bar and extended through the opening of the ring, the front webs of the upper portions having their lower ends fixed to the upper portion of the respective rings, and said leg loops each having an end fixed to the rings of their respective adjusting means and their opposite ends adjustably looped around their respective lock bar and extended through the opening of the respective ring.

3. The harness as described in claim 1 in which the waist belt at one side of the buckle connection at the front of the harness has a crosswise movable lanyard connecting ring.

4. The harness of claim 1 in which the crossed portions of the back webs have a rearwardly and upwardly extending lanyard connecting ring attached therewith.

5. The industrial safety harness as described in claim 1 in which the front web upper portions are provided with lanyard connecting rings longitudinally slidable therealong, and in which the waist belt at one side of the buckle connection has a crosswise movable front lanyard connecting ring, and in which the crossing locus of the back webs have a rearwardly and upwardly extending lanyard connecting ring attached therewith.

6. The harness as described in claim 1 in which the belt is an opening type belt having ends, the buckle of the belt comprising a pair of quick interconnectable and quick releasable metal sections, one of said buckle sections having means to adjustably connect to an end of the belt portion for girth adjustment of the belt and the other buckle section having means to connect it to the other end of the belt and having a hook-shaped portion remote from its connection to the belt end to releasably engage the adjustable buckle section, and magnetic means to hold said buckle sections in connected relation until manually opened.

7. The safety harness described in claim 6 in which a flexible tab is connected to the outer end of the buckle section having the adjusting means remote from the locus of interconnection of the buckle sections, and a lift-the-dot connector having one connector portion attached to the said flexible tab at its free end and its other connector portion attached to said belt.

8. The industrial harness as described in claim 1 in which a strong flexible net type vest back is fixedly connected at its upper corners to the shoulder webs and at its lower corners slidably connected to the lower ends of the back webs appreciably below the crossing locus of said back webs.

9. The harness as described in claim 8 in which the flexible vest back has an opening through which extends a looped portion of the back webs at the location of crossing of the back webs to which a lanyard ring is pivotally connected, the latter being located to the rear of the flexible vest back.

10. In an industrial safety harness the combination of a pair of front length multiple piece webs positioned at each side of the upright medial line of the harness, means intermediate the ends of each of said webs to adjust the respective lengths thereof, size adjustable leg looped webs connected to the lower ends of the front webs, back webs connected at the lower ends to each of the leg loops at the rear thereof and extending up in crossed relation at the upper portion of the harness, shoulder webs connected to the upper ends of the front webs and back webs, the crossed back webs above and below the point of crossing having a strong flexible member secured to the crossed back webs above and below the point of crossing of said back webs to slacken the back webs and define a double web looped back web portion between the secured points of said flexible member, and a lanyard connecting ring secured to said back web looped portion at the rear of the harness.

11. The harness of claim 10 in which the ring extends upwardly and means is provided on said ring to engage said looped portion to permit it to have only a limited rotational movement on the said looped portion with the ring always extending upwardly.

12. The hardness of claim 11 in which a flexible vest sized back member is connected at its upper ends upon the rear of the back webs above the locus of crossing of the back webs and its lower corners being adjustably connected to the back webs in slidable relation appreciably below the point of crossing of the back webs and which member has an opening therein through which the looped portion of the back webs extends, with the lanyard ring lying to the rear of the said flexible vest sized member and extended upwardly.

13. In an industrial safety harness the combination of multiple piece front flexible webs, looped leg webs connected to the lower ends of each of said front webs, back webs connected to said leg loops and extending upwardly to the rear in crossed relation, shoulder straps connected to the upper ends of the front webs and back webs, and a belt having connection with said front webs intermediate the ends thereof, said belt comprising rear and side portions the ends of which are extended to provide loops at the facing sides of the separate front webs, a front belt web adjustably connected to one of said loops, and a belt buckle having a section connected to the other looped end of the back portion of the belt and a second section having means adjustably connected to the end of the front belt portion remote from the first mentioned adjustable connector of said front web.

(References on following page)

References Cited

UNITED STATES PATENTS

| | | | | |
|---|---|---|---|---|
| 1,784,162 | 12/1930 | Smith | 244—151 |
| 1,939,062 | 12/1933 | Knight | 244—151 |
| 2,411,381 | 11/1946 | Manson | 244—151 |
| 2,594,018 | 4/1952 | Hillesheim | 244—151 |
| 2,605,065 | 7/1952 | Wilkins | 244—151 X |
| 2,661,888 | 12/1953 | Sidlinger | 119—96 |
| 2,758,769 | 8/1956 | Nunn et al. | 119—96 |
| 2,979,028 | 4/1961 | Zakely | 119—96 |
| 3,127,650 | 4/1964 | Seward | 24—201.2 X |
| 3,176,793 | 4/1965 | Hlacia | 119—96 X |
| 3,258,231 | 6/1966 | Basnett | 244—151 |

ALDRICH F. MEDBERY, *Primary Examiner.*

U.S. Cl. X.R.

244—151